Figure 1:
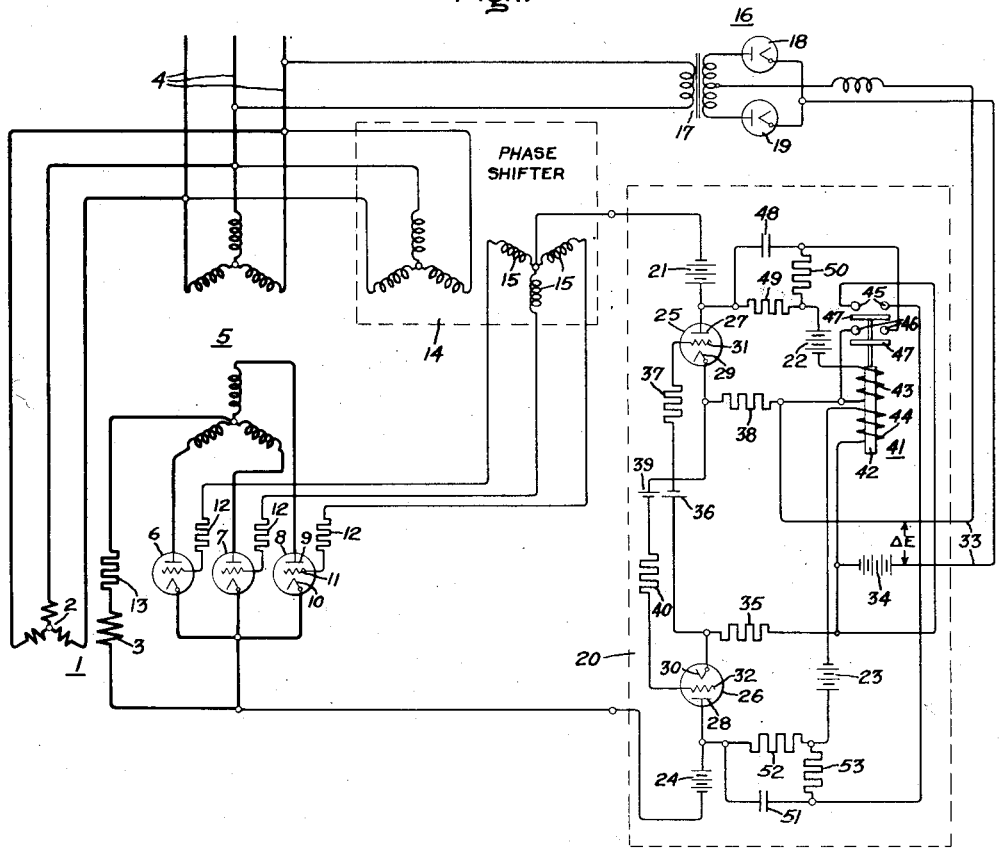

May 17, 1938.  C. OKAWA ET AL  2,117,908
ELECTRIC VALVE CIRCUIT
Filed Oct. 6, 1936  2 Sheets-Sheet 1

Inventors:
Chukichi Okawa,
Shigenobu Wada,
by Harry E. Dunham
Their Attorney.

May 17, 1938.  C. OKAWA ET AL  2,117,908
ELECTRIC VALVE CIRCUIT
Filed Oct. 6, 1936  2 Sheets-Sheet 2

Inventors:
Chukichi Okawa,
Shigenobu Wada,
by Harry E. Dunham
Their Attorney.

Patented May 17, 1938

2,117,908

UNITED STATES PATENT OFFICE 2,117,908

ELECTRIC VALVE CIRCUIT

Chukichi Okawa and Shigenobu Wada, Tokyo, Japan, assignors to General Electric Company, a corporation of New York Application October 6, 1936, Serial No. 104,287 In Japan October 26, 1935

14 Claims. (Cl. 171—119)

Our invention relates to electric valve circuits and more particularly to control or excitation circuits for electric valves.

Heretofore there have been devised numerous systems for controlling the conductivity of electric valves in accordance with predetermined controlling influences. In electrical controlling or regulating systems it is frequently desirable to provide means for controlling an electrical or operating condition of associated electrical apparatus in proportion to a controlling influence within a predetermined range of the controlling influence and to provide a rapid and greater change in the control in the event the controlling influence varies beyond the predetermined range. For example, in voltage regulating systems for dynamo-electric machines, various arrangements have been proposed for controlling the excitation of the machines in accordance with the voltage of the machines. Some of these arrangements cause small changes in the excitation of the associated machines for small changes in terminal voltage and introduce rapid and great changes in the excitation where the voltage varies beyond a predetermined range. Many of the prior art arrangements of this type are electro-mechanical in nature and construction and by virtue of this fact inherently are subjected to an appreciable delay in operation. There has been evidenced a decided need for systems employing electronic discharge devices to effect the above-described type of control and which will accomplish the desired result by involving only an inappreciable delay.

It is an object of our invention to provide a new and improved control or regulating system.

It is another object of our invention to provide a new and improved electric valve regulating system.

It is a further object of our invention to provide a new and improved regulating system for dynamo-electric machines.

It is a still further object of our invention to provide a new and improved electric valve voltage regulating system for dynamo-electric machines whereby the excitation is controlled in proportion to the voltage within a predetermined range of the voltage and whereby the excitation is rapidly changed for variations in the voltage beyond the predetermined range.

In accordance with the illustrated embodiments of our invention, we provide voltage controlling or regulating arrangements whereby the excitation of a field winding of a dynamo-electric machine is controlled in accordance with an operating condition such as the terminal voltage of the machine. The field winding of the machine is energized from an alternating current circuit through any suitable electric valve aggregate. To effect control of the current supplied to the field winding and hence to effect control of the excitation of the machine, the conductivity of the associated electric valves is controlled in accordance with the terminal voltage of the machine. The regulating systems are arranged so that for variations of terminal voltage within a predetermined range of terminal voltage the conductivity of the electric valves and hence the excitation of the machine are controlled in proportion to the variations in the terminal voltage. For variations in terminal voltage beyond the predetermined range, the conductivity of the electric valves is controlled independently of the amount of the variation in the terminal voltage to effect a rapid change in the excitation of the machine. Any suitable means may be provided for introducing into the regulating system a unidirectional voltage which varies in accordance with the terminal voltage of the machine. Within a predetermined range of the variable unidirectional voltage the conductivity of the electric valves is controlled in proportion to the amount of variation of the unidirectional voltage by controlling the magnitude of the biasing voltage impressed on the control members of the electric valves. When the variation of the unidirectional voltage exceeds a predetermined value, the regulating systems introduce into excitation circuits for the electric valves large components of unidirectional biasing potentials to render the electric valves fully conductive or entirely non-conductive. This rapid change in the conductivity of the electric valves is maintained for only a short interval of time and upon restoration of the terminal voltage to the predetermined range, the regulating systems then function to remove the large components of unidirectional biasing potentials and to control the conductivity of the valves in proportion to the amount of variation in the terminal voltage. In one embodiment of our invention the control of the large components of unidirectional biasing potentials is effected by means of electric valves supplemented by electro-mechanical devices and in another embodiment of our invention this result is effected by means of associated electric valve circuits which are selectively controlled by the varying component of unidirectional potential derived from the dynamo-electric machine.

For a better understanding of our invention reference may be had to the following description taken in connection with the accompanying drawings and its scope will be pointed out in the appended claims. Fig. 1 diagrammatically illustrates an embodiment of our invention as applied to a regulating system for controlling the energization of a dynamo-electric machine of the synchronous type, and Figs. 2, 3, 4 and 5 represent certain operating characteristics of our invention. Fig. 6 diagrammatically represents another embodiment of our invention in which the regulating system comprises means wholly electrical in construction and operation.

Referring to Fig. 1 of the accompanying drawings, our invention is diagrammatically illustrated as applied to an electric valve regulating system for controlling the excitation of a dynamo-electric machine. To explain our invention, we have chosen to represent our invention as applied to a dynamo-electric machine 1 of the synchronous type having an armature winding 2 and a field winding 3. The armature winding 2 is connected to an alternating current circuit 4 and the field winding 3 is energized from the alternating current circuit 4 through a transformer 5 and electric valves 6, 7 and 8, preferably of the type employing an ionizable medium such as a gas or a vapor. Each of the electric valves 6, 7 and 8 is provided with an anode 9, a cathode 10 and a control member 11. The circuit 4, transformer 5 and the electric valves 6, 7 and 8 function to supply direct current to energize a load circuit including the field winding 3 and a suitable current limiting resistor 13. While we have shown each of the rectifying devices 6, 7 and 8 as being of the type employing a single anode and a single cathode, it should be understood that we may employ electric valves of the type having a plurality of anodes and a single cathode within an enclosing receptacle.

To impress on the control members 11 of electric valves 6, 7 and 8 alternating potentials adjustable in phase relative to the potentials impressed on the associated anode, we employ a phase shifter 14 which may be any of the arrangements well known in the art such as the conventional rotary phase shifter or phase shifting circuits of the impedance type. The phase shifter 14 is shown as being of the rotary type and is provided with secondary windings 15 which impress alternating potentials on the control members 11 of electric valves 6, 7 and 8. Current limiting resistances 12 are connected in series relation with control members 11.

In order to obtain a unidirectional potential which varies in accordance with an operating condition, such as the terminal voltage of the dynamo-electric machine 1 or the voltage of the alternating current circuit 4, we employ any conventional circuit such as the bi-phase rectifier 16 including a transformer 17 and electric valves 18 and 19.

We provide a control or regulating system 20 for controlling the conductivity of electric valves 6, 7 and 8, and hence to effect control of the energization of field winding 3 of dynamo-electric machine 1 in accordance with an electrical condition such as the voltage of the machine 1 or the voltage of the alternating current circuit 4. The regulating system includes sources of unidirectional potential 21, 22, 23 and 24 which are employed to furnish large components of unidirectional biasing voltages which under certain conditions impress voltages of predetermined sign on the control members 11 of electric valves 6, 7 and 8. While the sources of unidirectional potential 21, 22, 23 and 24 are represented in Fig. 1 as batteries, it should be understood that these voltages may be supplied by other suitable means such as separate generators or rectifying devices. It is to be noted that direct current sources 21 and 22 are oppositely disposed relative to each other and that direct current sources 23 and 24 are oppositely disposed relative to each other so that these sources impress practically no biasing voltage on control members 11 of electric valves 6, 7 and 8 under certain operating conditions of the regulating system 20. Electric valves 25 and 26 having anodes 27, 28, cathodes 29, 30 and control members 31, 32, respectively, are employed to control selectively the direct current sources 21 to 24, inclusive, so that there is impressed on the control members 11 of electric valves 6, 7 and 8 suitable restoring voltages of large magnitude when the voltage of the dynamo-electric machine 1 varies beyond a predetermined range of values. The output of the bi-phase rectifier 16 is impressed on the regulating system 20 through conductors 33. As a standard voltage source against which the output voltage of the bi-phase rectifier operates, we employ any suitable source of unidirectional potential such as a battery 34. The resultant of the unidirectional potential supplied by the bi-phase rectifier 16 and the battery 34 is impressed on control members 31 and 32 of electric valves 25 and 26, respectively, to control the conductivity of these valves. In particular, the negative terminal of the battery 34 is connected to control member 31 of electric valve 25 through a resistance 35, a suitable source of negative biasing potential such as a battery 36 and current limiting resistance 37. Control member 32 of electric valve 26 is connected to the upper conductor 33 through a resistance 38, a suitable source of negative biasing potential such as a battery 39 and a current limiting resistance 40.

To render the electric valves 25 and 26 non-conductive after the lapse of a very short interval of time, we employ an electroresponsive device 41 having an armature member 42, actuating windings 43 and 44, stationary contacts 45 and 46 and bridging members 47. Associated with the electric valve 25 we provide a capacitance 48 and resistances 49 and 50 which serve to impress on the anode 27 of electric valve 25 a negative transient potential to render electric valve 25 non-conductive when contacts 46 of device 41 are closed by the lower bridging member 47. Similarly, a capacitance 51 and resistances 52 and 53 are associated with electric valve 26 to impress a negative transient potential on the anode 28 of this valve through contacts 45 of device 41 to render electric valve 26 non-conductive.

The operation of the control or regulating system diagrammatically shown in Fig. 1 of the drawings will be explained by considering the system when the dynamo-electric machine 1 is operating as a synchronous generator supplying energy to the alternating current circuit 4. Direct current will be supplied to the field winding 3 from the alternating current circuit 4 through transformer 5 and electric valves 6, 7 and 8. As will be well understood by those skilled in the art, the average voltage impressed by electric valves 6, 7 and 8 on the field circuit may be controlled by varying the phase of the potentials impressed on the control members 11 relative to the potentials impressed on the respective associated anodes 9. In other words, as the alternating potentials impressed on the control members 11 are retarded in phase relative to the potentials impressed on the respective associated anodes, the voltage impressed on the field circuits will be decreased.

Figure 2:
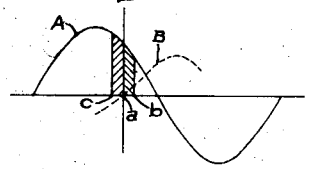
Figure 3:
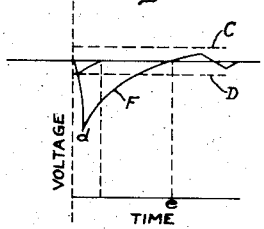

Referring to Fig. 2 of the accompanying drawings, the curve A may be employed to represent the voltage impressed on the anode of one of the electric valves and the curve B may be employed to represent the potential impressed on the associated control member 11. The electric valves will be rendered conductive at a time when the potential impressed on the control member 11 becomes sufficiently positive relative to the cathode 10. Let it be assumed that the transformer 5 is designed so that a satisfactory exciting current is supplied to the field winding 3 when the potentials impressed on the control members 12 have a phase position corresponding to curve B of Fig. 2.

Let it be assumed further that the values of the negative biasing potentials impressed on the control circuits for electric valves 25 and 26 by batteries 36 and 39 are of sufficient magnitude so that these valves will be maintained non-conductive for a predetermined range of the unidirectional output potential of the bi-phase rectifier 16. If the variation in the output potential of the bi-phase rectifier 16 be represented by the term ΔE, it will be noted that for a predetermined range of the quantity ΔE the conductivity of electric valves 6, 7 and 8 will be controlled in proportion to the variation in the quantity ΔE without rendering electric valves 25 or 26 conductive. Within this range of variation in the quantity ΔE and hence within a corresponding range of voltage of the alternating current circuit 4, the biasing potential impressed on the control members 11 of electric valves 6, 7 and 8 will be varied by an amount corresponding to the variation in the quantity ΔE. For example, if the voltage of the alternating current circuit 4 decreases to a value within the predetermined range, the quantity ΔE will become less positive to effect a decrease in the negative biasing potential impressed on the control members 11 of electric valves 6, 7 and 8. This decrease in the negative biasing potential will effect an advancement in the time of each positive half cycle at which electric valves 6, 7 and 8 are rendered conductive so that the voltage which these valves impress on the field circuit of machine 1 is increased. The circuit through which this reduced negative biasing voltage acts includes the upper conductor 33, actuating winding 43 of device 41, direct current source 22, resistance 49, direct current source 21, secondary windings 15 of phase shifter 14, control members 11, cathodes 10, direct current source 24, resistance 52, direct current source 23, actuating winding 44 of device 41, standard voltage source 34 and the lower conductor 33. By virtue of this advancement in phase of the potentials impressed on control members 11 of electric valves 6, 7 and 8, the current supplied to field winding 3 will be increased to effect an increase in the excitation of the machine 1, tending to restore the terminal voltage of the machine to a predetermined value. Conversely, if the voltage of the alternating current circuit 4 or the voltage of the machine 1 increases to a value within the predetermined range, there will be introduced in the excitation circuits for electric valves 6, 7 and 8 an increased negative biasing potential to effect a retardation in the time of the positive half cycles at which electric valves 6, 7 and 8 are rendered conductive. Since the direction of change of the quantity ΔE is reversed relative to that considered above, the negative biasing potential will be increased and will be impressed on the control members 11 through the above-described circuit, thereby causing a decrease in the current supplied to the field winding 3 and serving to decrease the terminal voltage of the machine 1. It is to be noted that within this predetermined range of voltages of the dynamo-electric machine 1, the change in the excitation of the machine is proportional to the amount of variation in the terminal voltage of the machine 1.

For variations in voltage beyond the predetermined range, the regulating system 20 introduces in the excitation circuits for electric valves 6, 7 and 8 large components of unidirectional biasing potential which tend to restore the terminal voltage to the predetermined range within a relatively short interval of time. This selective control of excitation of the machine 1 is accomplished by introducing into the excitation circuit large components of unidirectional biasing potential to render the electric valves 6, 7 and 8 either entirely conductive or entirely non-conductive. Considering the operation of the regulating system 20 in particular, if it be considered that the voltage of the machine 1 decreases to a value below the above-described predetermined range, the electric valve 26 will be rendered conductive due to the increase in positive voltage impressed on control member 32 through the circuit including the upper conductor 33, resistance 38, battery 39, resistance 40, control member 32, cathode 30, resistance 35, standard voltage source 34 and the lower conductor 33. When electric valve 26 is rendered conductive it becomes effective to increase in a positive direction the net biasing potential impressed in the excitation circuits for electric valves 6, 7 and 8. Specifically, electric valve 26 shunts the battery 23 so that there is impressed in the excitation circuit a net positive potential of relatively large magnitude, for example, the potential due to the battery 24. This large positive biasing potential is impressed in a circuit including electric valve 26, resistance 35, standard voltage source 34, conductors 33, actuating winding 43 of device 41, direct current source 22, resistance 49, direct current source 21, secondary windings 15 of phase shifter 14, control members 11 and cathodes 10. It is to be noted that this large component of unidirectional potential is of the proper polarity so that electric valves 6, 7 and 8 are rendered fully conductive to effect a sudden increase in the current supplied by the field winding 3, thereby causing a rapid increase in the terminal voltage of the machine 1. The net increase in current, which flows in these excitation circuits and in the regulating system by virtue of this increase in voltage, sufficiently energizes the actuating winding 43 of device 41 so that the armature 42 is raised, causing the upper bridging member 47 to close stationary contacts 45. Upon bridging contacts 45, a circuit is completed to impress on the anode 28 of electric valve 26 a negative transient potential due to the discharge of capacitance 51 which renders electric valve 26 non-conductive after the lapse of a short interval of time. If the voltage of the machine 1 has been restored to a value within the predetermined range, the regulating system 20 will continue to control the conductivity of electric valves 6, 7 and 8 in proportion to the amount of variation of the terminal voltage of the machine 1. However, if the voltage of the machine remains below the predetermined range, electric valve 26 will be rendered conductive again to effect a rapid increase in the excitation of machine 1.

If the voltage of the dynamo-electric machine 1 or the voltage of the alternating current circuit 4 increases to a value greater than the predetermined range, electric valve 25 will be rendered conductive to produce in the excitation circuits for electric valves 6, 7 and 8 a relatively large negative biasing potential, the magnitude of which is independent of the amount of variation of the voltage of the associated circuit. When the voltage exceeds the predetermined range, a positive potential is impressed on control member 31 of electric valve 25 through a circuit including the lower conductor 33, source of standard potential 34, resistance 35, battery 36, resistance 37, control member 31, cathode 29, resistance 38 to the upper conductor 33. Upon being rendered conductive, the electric valve 25 acts as an effective short circuit relative to the source of potential 22 so that the negative biasing voltage of source 21 is impressed on the control members 11 of electric valves 6, 7 and 8. The circuit through which this negative biasing potential acts includes a source of potential 21, secondary windings 15 of phase shifter 14, control members 11, cathodes 10, source of potential 24, resistance 52, source of potential 23, actuating winding 44 of device 41, source of standard potential 34, conductors 33, resistance 38, electric valve 25 and source of potential 21. This large negative biasing potential renders electric valves 6, 7 and 8 entirely non-conductive, tending to rapidly decrease the excitation of the dynamo-electric machine 1 and to decrease rapidly the terminal voltage. The increase in current in the excitation circuit and the increase in current in the regulating system 20 actuates the armature 42 of device 41 bridging contacts 46 to impress on the anode 27 of electric valve 25 a transient negative potential due to the discharge of capacitance 48, rendering the electric valve 25 non-conductive. If the terminal voltage of the machine 1 is reduced to a value within the predetermined range, the net biasing potential impressed on control members 11 of electric valves 6, 7 and 8 will be varied by an amount corresponding to the variation in the terminal voltage. However, if the voltage remains above the predetermined range, the electric valve 25 will be rendered conductive again to effect another rapid decrease in the excitation of the machine 1.

Further desirable operating characteristics of the embodiments of our invention will be noted upon consideration of the operating characteristics represented in Figs. 2 to 5, inclusive. Considering Fig. 2, it is well known that the conductivity of the electric valves, such as electric valves 6, 7 and 8 in the arrangement of Fig. 1, may be controlled by shifting the phase of the potential impressed on control members 11. This effective shift in the control potential may be accomplished as explained above by controlling the biasing potential impressed on the control member. For example, if the system is operating within the predetermined range of voltage, the conductivity of each of the electric valves may be decreased by increasing the negative biasing potential so that the control members 11 render the electric valves conductive at a time corresponding to the point b. The conductivity of the electric valves may be increased by decreasing the negative biasing potential so that the electric valves are rendered conductive at a time corresponding to the point c. It is, therefore, apparent that so long as the change is negative biasing potential corresponds to the amount of variation in the electrical quantity to be regulated the time required to restore the electrical quantity to a predetermined value will be greater than the time required under conditions in which the biasing potential is controlled in greater steps to effect a more rapid change in the conductivity of the electric valves. Considering in particular the operating characteristics shown in Fig. 3 where the voltage recovery curve is shown as a function of time. Let the region between the lines C and D represent the predetermined range within which the biasing voltage varies in proportion to the variation in the electrical quantity to be regulated; and let the curve F represent the variation of the terminal voltage of the machine 1 as a function of time. If it be assumed that the terminal voltage of the dynamo-electric machine 1 decreases to a value corresponding to the point d, the rate at which the voltage returns to the predetermined range will be relatively low if the restoring force or negative biasing potential is varied in proportion to the change in the voltage. Under these conditions, the voltage of the machine 1 will be restored to the predetermined value at time e.

Figure 4:
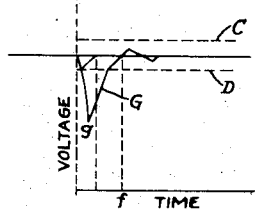

In Fig. 4 there is represented the voltage recovery curve when a relatively large component of uni-directional potential is impressed on the control members 11 of the electric valves 6, 7 and 8 to effect a rapid restoration to the predetermined range when the voltage decreases to a value below the predetermined range of values. Curve G represents the variation of the terminal voltage as a function of time. Upon decrease in terminal voltage of machine 1 at a time corresponding to the point g, the large component of positive biasing potential is introduced in the excitation circuit to render the electric valves 6, 7 and 8 completely conductive, restoring the terminal voltage to the predetermined value at a time corresponding to the point f. It is, therefore, apparent upon examination of Figs. 3 and 4 that the rate of recovery under conditions represented in Fig. 4 is substantially greater than the rate of recovery under conditions represented in Fig. 3.

Figure 5:
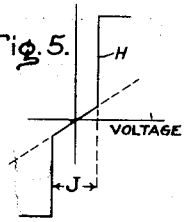
Figure 6:
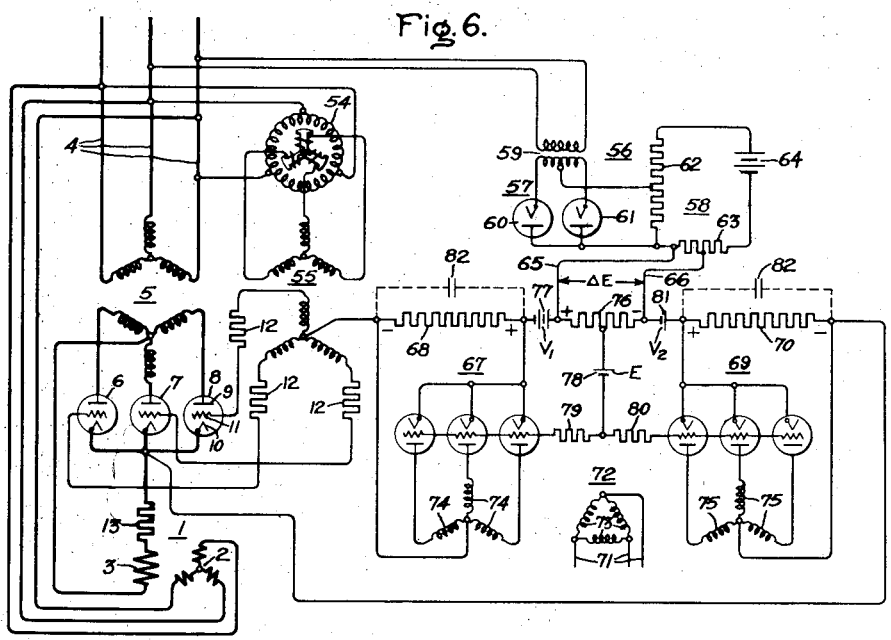

Fig. 5 represents the restoring force or tendency exerted by apparatus embodying our invention under certain operating conditions. The curve H represents the restoring force as a function of the terminal voltage. Within the range of voltages corresponding to the region J, the restoring force is proportional to the amount of change in the terminal voltage. Above and below the range of voltages corresponding to the region J, there is a decided increase in the restoring force occasioned by the sudden increase or decrease in the biasing potentials introduced in the excitation circuits for electric valves 6, 7 and 8. Beyond the region J, the magnitude of the restoring force is completely independent of the amount of the variation in the line or terminal voltage.

In Fig. 6 of the drawings there is diagrammatically shown another embodiment of our invention wholly electrical in construction and operation. The arrangement of Fig. 6 is substantially the same as that shown in Fig. 1 and corresponding elements have been assigned like reference numerals. Alternating potentials are impressed on control members 11 of electric valves 6, 7 and 8 through any conventional phase shifting device such as the rotary phase shifter 54, a transformer 55 and current limiting resistances 12. In order to obtain a component of unidirectional potential which varies in accordance with an electrical quantity such as the terminal voltage of the dynamo-electric machine 1 or the voltage of the alternating current circuit 4, we employ any conventional means such as a control circuit 56 including a bi-phase rectifier 57 and a circuit 58. The bi-phase rectifier circuit includes a transformer 59 and electric valves 60 and 61. The circuit 58 includes serially connected resistances 62 and 63 which are connected across the terminals of any suitable source of direct current such as a battery 64. A voltage which varies inversely with the voltage of the alternating current circuit 4 appears between conductors 65 and 66 and is employed to control the conductivity of electric valves 6, 7 and 8 in accordance with the voltage of the alternating current circuit 4.

A group of electric valves 67 serve to introduce in the excitation circuit for electric valves 6, 7 and 8 a negative biasing potential of relatively large value to render these electric valves 6, 7 and 8 entirely non-conductive when the voltage of machine 1 increases to a value above a predetermined range. This negative biasing potential is introduced into the excitation circuits by means of a resistance 68 through which the output current of the electric valves in group 67 is conducted. A group of electric valves 69 introduces in the excitation circuits for electric valves 6, 7 and 8 a positive biasing potential of relatively large magnitude when the voltage of machine 1 decreases to a value below the predetermined range. The output current of electric valves of group 69 is conducted through a resistance 70 and introduces in the excitation circuit a potential which is in opposition to the potential introduced into the circuit by the resistance 68. The groups of electric valves 67 and 69 may be energized from any suitable polyphase source of potential, such as a source 71, through a transformer 72 having primary windings 73 and secondary windings 74 and 75. The output potential of the control circuit 56 is impressed on a resistance element 76 to introduce in the excitation circuits a potential which varies in proportion to the amount of variation of the voltage of machine 1. A source of standard potential, such as a battery 77, is connected in the excitation circuit to oppose the potential introduced into the excitation circuit by the control circuit 56. The control members of the valves in groups 67 and 69 are connected to an electrically intermediate point of the resistance 76 through a source of potential 78 and resistances 79 and 80, respectively. A suitable source of unidirectional potential, such as a battery 81, is connected between the resistance 76 and the resistance 70 to introduce in the excitation circuits a negative biasing potential. Capacitances 82 are connected across the terminals of resistances 68 and 70 to suppress transient voltages which may exist in the excitation circuits.

In explaining the operation of the embodiment of our invention diagrammatically shown in Fig. 6, it will be assumed that the control circuit 56 supplies across the conductors 65 and 66 a unidirectional potential, the magnitude of which varies inversely relative to the R. M. S. voltage of the alternating current circuit 4 or the terminal voltage of the dynamo-electric machine 1. If the variation of the terminal voltage of the dynamo-electric machine 1 is within a predetermined range, the regulating system will control the conductivity of electric valves 6, 7 and 8 in proportion to the amount of variation in the terminal voltage. For the purpose of facilitating the explanation, let the voltage of the battery 77 be represented by the term $V_1$, the voltage of battery 81 by the term $V_2$, the voltage of battery 78 by the term $E$, and the voltage appearing across the conductors 65 and 66 by the term $\Delta E$. Furthermore, let it be assumed that the values of the voltages of batteries 77, 78 and 81 are chosen so that: $V_1-V_2=E$. The control circuit 56 is designed so that $\Delta E$ varies inversely as the terminal voltage of machine 1. Within the predetermined range of the voltage of machine 1, it is necessary that the electric valves of groups 67 and 69 be maintained non-conductive. This is effected by virtue of the relative magnitudes and directions of the potentials introduced into the circuit by means of batteries 77, 78 and 81. The valves of groups 67 and 69 will be maintained non-conductive so long as $$\frac{\Delta E}{2}$$

is less than $V_1+E$. Within this range of values, the voltage $\Delta E$ controls the conductivity of electric valves 6, 7 and 8 in proportion to the amount of variation in the terminal voltage of machine 1.

If the voltage of the machine 1 decreases to a value less than the predetermined range so that the condition, $V_1$ is less than $$\frac{\Delta E}{2}+E,$$

is satisfied, the increase in the value of the voltage $\Delta E$ will render the valves in group 69 conductive and maintain the valves in group 67 non-conductive, so that there is impressed in the excitation circuits for electric valves 6, 7 and 8 a positive biasing potential of relatively large magnitude tending to rapidly increase the excitation of machine 1 and to restore the terminal voltage to the predetermined range. Conversely, if the voltage of the alternating current machine 1 rises to a value above the predetermined range so that the condition, $V_1$ is less than $$\frac{\Delta E}{2}+E,$$

is satisfied, the decrease in the voltage $\Delta E$ will render the valves in group 67 conductive and maintain the valves in group 69 non-conductive, impressing in the excitation circuit for electric valves 6, 7 and 8 the negative biasing potential, rendering these latter valves completely non-conductive. By this action, the excitation of machine 1 will be decreased rapidly to restore the terminal voltage of machine 1 to the predetermined range.

It is to be noted that the regulating systems described in connection with the embodiments of our invention diagrammatically shown in Figs. 1 and 6 control the conductivity of electric valves 6, 7 and 8 in proportion to or by an amount corresponding to the variation in the terminal voltage of the machine 1 within a predetermined range of voltages of the machine 1. Beyond this range of voltages, the conductivity of the electric valves 6, 7 and 8 is controlled disproportionately relative to the amount of change in the terminal voltage of machine 1 and for great changes in terminal voltage there is introduced into the excitation circuits for these valves unidirectional biasing potentials, the magnitudes of which are completely independent of the variations in the electrical quantity to be regulated.

While we have shown and described our invention as applied to a particular system of connections and as embodying various devices diagrammatically shown, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, an electric circuit, a dynamo-electric machine connected thereto and having a field winding, apparatus for energizing said field winding including electric valve means having a control member, an excitation circuit for energizing said control member comprising means for impressing on said control member a variable unidirectional biasing potential to control the conductivity of said electric valve means to control the energization of said field winding in proportion to the amount of the deviation of an operating characteristic of said machine from a predetermined value, and means for impressing on said control member unidirectional potentials to change substantially the conductivity of said electric valve means to control the energization of said field winding disproportionately relative to the amount of deviation of said condition when said condition departs from a predetermined range of values.

2. In combination, a supply circuit, a load circuit, electric valve means interposed between said circuits, means for controlling the conductivity of said electric valve means in proportion to the departure of an electrical condition of one of said circuits from a predetermined value, and means for controlling the conductivity of said electric valve means independently of the amount of change in said electrical condition for values of said electrical condition beyond a predetermined range.

3. In combination, a supply circuit, a load circuit, translating apparatus interconnecting said circuits including electric valve means, means for controlling the conductivity of said electric valve means in proportion to the deviation of an electrical condition of one of said circuits from a predetermined value within a predetermined range of said condition, and means for rendering said electric valve means non-conductive when said electrical condition increases to a value above said predetermined range.

4. In combination, a supply circuit, a load circuit, translating apparatus interconnecting said circuits including electric valve means having a control member, means for energizing said control member to control the conductivity of said electric valve means in proportion to the deviation of an electrical condition of one of said circuits from a predetermined value, and means for energizing said control member to control the conductivity of said electric valve means disproportionately relative to the amount of variation of said electrical condition when said electrical condition departs from a predetermined range of values.

5. In combination, a supply circuit, a load circuit, electric valve means interconnecting said cuits and having a control member, and an excitation circuit for energizing said control member comprising means for introducing in said excitation circuit a potential which varies in accordance with an electrical condition of one of said circuits to control the conductivity of said electric valve means in proportion to the deviation of said electrical condition from a predetermined value within a predetermined range of values and means for introducing in said excitation circuit voltages to control the conductivity of said electric valve means disproportionately relative to the amount of deviation of said electrical condition when said electrical condition departs from said predetermined range of values.

6. In combination, a supply circuit, a load circuit, electric valve means interconnecting said circuits and having a control member, a source of alternating potential, a source of unidirectional potential which varies in accordance with a predetermined electrical condition of one of said circuits, means for impressing on said control member the resultant of said alternating potential and said unidirectional potential to control the conductivity of said valve means in proportion to the deviation of said condition from a predetermined value within a predetermined range of said condition, and means for impressing on said control member a second unidirectional potential to control the conductivity of said valve means disproportionately relatively to said electrical condition for deviations of said electrical condition beyond said predetermined range.

7. In combination, a supply circuit, a load circuit, electric valve means interposed between said circuit, and means for controlling the conductivity of said electric valve means in proportion to the departure of an electrical condition of one of said circuits from a predetermined value within a predetermined range of said condition and for controlling the conductivity of said electric valve means disportionately relative to said electrical condition for values of said electrical condition outside said predetermined range.

8. In combination, a supply circuit, a load circuit, electric valve means interposed between said circuits, means for controlling the conductivity of said electric valve means in proportion to the departure of an electrical condition of one of said circuits from a predetermined value within a predetermined range of said condition, and electric valve means for controlling the conductivity of said first mentioned electric valve means disproportionately relative to said electrical condition for values of said electrical condition outside said predetermined range.

9. In combination, a supply circuit, a load circuit, electric valve means interconnecting said circuits and having a control member, an excitation circuit for energizing said control member, a source of varying unidirectional potential to control the conductivity of said electric valve means in proportion to the deviation of an electrical condition of one of said circuits from a predetermined value, electric valve means for introducing in said excitation circuit a relatively large component of negative potential to render said first mentioned electric valve means nonconductive when said electrical condition increases to a value above a predetermined range of values, and electric valve means for introducing in said excitation circuit a relatively large component of positive unidirectional potential to increase substantially the conductivity of said first mentioned electric valve means when said electrical condition decreases to a value less than said predetermined range of values.

10. In combination, an alternating current circuit, a load circuit, electric valves interposed between said circuits, means for controlling the initiation of the discharge of said electric valve means at any point in the positive cycle of anode voltage of said electric valve means for a predetermined range of values of a variable condition to be controlled, and means for rendering said electric valves conductive or nonconductive throughout the positive half cycles of anode voltage of said electric valve means for any value of said variable condition beyond said predetermined range of values.

11. In combination, an electric valve means having a control member, and an excitation circuit for energizing said control member comprising a source of unidirectional potential for controlling the conductivity of said electric valve means in proportion to the amount of deviation of a controlling influence from a predetermined value, additional sources of unidirectional potential, and means for controlling said last mentioned sources of potential to impress on said control members potentials to effect control of said electric valve means disproportionately relative to the amount of deviation of said controlling influence when said influence departs from a predetermined range of values.

12. In combination, an electric valve means having a control member, an excitation circuit for energizing said control member, means for introducing in said excitation circuit a potential to control the conductivity of said electric valve means in proportion to the amount of variation of a controlling influence for values of said controlling influence within a predetermined range, and means for introducing in said excitation circuit a potential to control the conductivity of said electric valve means disproportionately relative to the amount of variation of said controlling influence for values of said controlling influence outside said range.

13. In combination, electric valve means having a control member, an excitation circuit for energizing said control member including a source of alternating potential, a source of unidirectional potential variable in proportion to the deviation of a controlling influence from a predetermined value, means for impressing on said control member the resultant of said alternating potential and said unidirectional potential, sources of oppositely disposed unidirectional potentials of magnitudes relatively large compared to that of said first mentioned source of unidirectional potential, and electric valve means responsive to said first mentioned unidirectional potential for selectively impressing said oppositely disposed unidirectional potentials on said control member when said controlling influence departs from a predetermined range of values.

14. In combination, a plurality of electric valve means each having a control member, excitation circuits each connected to a predetermined one of said electric valve means for energizing the associated control member, means for introducing in each of said excitation circuits an alternating potential, means for introducing in each of said excitations a variable unidirectional potential responsive to the amount of deviation of a controlling influence from a predetermined value to control the conductivity of said electric valve means in proportion to the amount of said deviation, and electric valve circuits selectively responsive to the magnitude of said unidirectional potential for introducing in said excitation circuits unidirectional potentials of large magnitudes relative to said first mentioned unidirectional potentials to control the conductivity of said electric valve means disproportionately relative to the amount of deviation of said controlling influence when said influence departs from a predetermined range of values.

CHUKICHI OKAWA.
SHIGENOBU WADA.